UNITED STATES PATENT OFFICE 2,136,389

REACTION PRODUCTS OF SULPHUR DIOXIDE AND OLEFINES

Carl Shipp Marvel, Urbana, Ill., and Donald Sherwood Frederick, Drexel Hill Plaza, Pa.; said Frederick assignor to said Marvel No Drawing. Application April 30, 1936, Serial No. 77,252

6 Claims. (Cl. 260—2)

This invention relates to polymeric reaction products and more particularly to the compositions obtainable by the reaction of sulphur dioxide with olefines. This application is directed to processes in which the aforementioned condensation is carried out in the presence of hydrogen peroxide as a catalyst.

It was known at least as early as 1898 that sulphur dioxide would add to some olefinic compounds (Sononina, J. Russ. Phys. Chem. Soc. 30, 826 and Chem. Zentr. 1, 248:1899). A great deal of literature on this reaction has appeared since that time. Present knowledge of the reaction between olefinic compounds and sulphur dioxide indicates that olefines in which one or more hydrogen atoms are replaced by such substituents as halogen, cyano and carboxyl react difficultly or not at all with sulphur dioxide. Olefines containing phenolic, aldehyde and ester groups are similarly non-reactive. Alcoholic hydroxyl groups in the olefines ordinarily do not interfere with the formation of a polymeric reaction product with sulphur dioxide, but it has been found that oleyl alcohol does not form such a condensation product. Experience predicates such an exception on the location of the double bond in the molecule. The preparation of cyclohexene-sulphur dioxide polymers by a process involving treating cyclohexene alternately with air and sulphur dioxide has been proposed in the literature (Jour. Am. Chem. Soc. 55, 3140).

The results, obtainable by processes reported prior to this invention, are erratic and the described processes are troublesome, not conducive to good yields, uneconomical and time-consuming. The principal object of the present invention was the production of a resinous composition having properties fitting it for commercial use, from cheap, easily available raw materials, by an inexpensive process. Other objects were the production of olefine-sulphur dioxide polymers in a very desirable physical and/or chemical form and in a high state of purity by simple and convenient methods. Still further objects were to devise new chemical and/or physical processes, to produce new chemical and/or physical compounds, to discover new catalysts for the sulphur dioxide-olefine condensation reaction, to discover means for accelerating the reaction, and to discover means and methods whereby reproducible results and better yields could be obtained in the production of olefine polysulphones. A general advance in the art and other objects which will appear hereinafter were also contemplated.

With the foregoing objects and related ends in view, it has been discovered that commercially valuable olefine polysulphones (i. e., polymeric olefine-sulphur dioxide addition products) can be obtained by contacting sulphur dioxide, in the presence of hydrogen peroxide, with an olefine of the formula

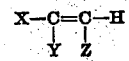

in which X represents hydrogen, methyl or hydroxymethyl, Y represents hydrogen, methyl or hydroxymethyl, and Z represents hydrogen or an alkyl group, which alkyl group may have one or more hydrogen atoms replaced by a hydroxyl or cycloaliphatic hydrocarbon radical, and in which Y and Z together may represent a saturated divalent hydrocarbon radical containing less than seven carbon atoms provided, however, that X, Y and Z are not all alkyl groups.

An understanding of the invention will be furthered by a consideration of the following detailed description and illustrative specific examples. Throughout the specification and claims quantities are given by weight unless otherwise indicated.

Example I

A cooled mixture consisting of 20 cc. of cyclohexene and 3 cc. of 2% aqueous hydrogen peroxide was mixed with 20 cc. of liquid sulphur dioxide, placed in a tightly stoppered heavy-walled flask and allowed to stand at room temperature (25°–30° C.) for about 24 hours. The flask was then cooled in a bath held at about —20° C. and opened. The viscous mass remaining in the flask was dissolved in 50 cc. of chloroform. The polymer obtained was then precipitated by adding a large volume (300 cc.) of diethyl ether to the solution. The polymer was collected on a Buchner funnel and sucked dry. Such a product may be further purified by grinding in a mortar, washing with diethyl ether, and filtering.

Example II

A cooled mixture consisting of 20 l. of cyclohexene, 5 l. of 95% ethanol, and 3 l. of 2% aqueous hydrogen peroxide was mixed with 20 l. of liquid sulphur dioxide, placed in a closed pressure container and allowed to stand at room temperature (25°–30° C.) for about 24 hours. The container was then cooled in a bath held at about —20° C. and opened. The viscous mass remaining in the container was dissolved in 50 l. of chloroform. The polymer obtained was then precipitated by adding a large volume (300 l.) of diethyl ether to the solution, and separated by filtration. After the solvent was removed, the solid was powdered in a mortar, washed thoroughly with diethyl ether, and again collected in a suction filter. The yield was 27-29 kg. (93-100% of the theoretical amount). The yield was somewhat higher than that obtained in Example I. Analysis of the product showed it to contain 21.46% sulphur. The calculated amount of sulphur present in a product of the formula $$(C_6H_{10}SO_2)_{40}C_6H_{11}OH$$

is 21.9%.

The above polymer was a white, amorphous solid which was very hard and brittle. It did not melt sharply but softened and decomposed at slightly above 200° C. It was quite soluble in chloroform and tetrachlorethane, and somewhat soluble in dioxan, ortho-dichlorobenzene, bromobenzene, and nitrobenzene. It was insoluble in other common organic solvents. Toluene and acetone softened but did not dissolve it. Evaporation of a dilute chloroform solution of the polymer left a brittle film. The polymer was insoluble in water, dilute acids, and dilute alkalies. It dissolved slowly in concentrated sulphuric acid and was precipitated, apparently unchanged when this solution was poured into water. The addition of a little dibutyl phthalate to a solution of the polymer in chloroform produced a soft, flexible film when the solution was flowed over metal or glass and the solvent evaporated.

*Example III*

Equimolar proportions of liquid propene and sulphur dioxide were reacted in the presence of ethanol and aqueous hydrogen peroxide. The proportions of the reactants and catalyst corresponded to those set out in Example II. A very vigorous reaction occurred. The reaction product was a white, amorphous solid, insoluble in common organic solvents and soluble in concentrated sulphuric acid. It was also soluble in concentrated nitric acid and in 0.1 normal sodium hydroxide. Upon heating to about 250° C., it began to decompose.

The molecules of many of the olefine-sulphur dioxide polymers described herein, for example those from cyclohexene, methyl propene, 1-pentene, 2-pentene, 3-cyclohexylpropene, and 1-nonene, have free hydroxyl groups which can readily be acylated. The acylated derivatives such as the acetates and haloactetates of these polymers are new and useful compounds which can be used for many of the purposes for which the polymers themselves are applicable. The term, haloacetates, is used to include dichloracetates and trichloracetates, as well as the corresponding derivatives containing other halogens instead of chlorine. Some of the acetylated derivatives, for example, the acetate of cyclohexene polysulphone, are, moreover, more stable than the unacetylated polymers.

*Example IV*

Ten (10) grams of cyclohexene-sulphur dioxide polymer (prepared according to either Example I or II) was dissolved in 40 cc. of acetyl chloride in the cold. The colorless solution thus obtained was poured very slowly into three liters of ice water. The solid precipitate was dried on a suction filter, washed thoroughly with water and then with ethyl alcohol and diethyl ether. The solid product was powdered and the washing was repeated. A yield of 9.5 grams was obtained.

The acetylated product had the same solubility characteristics as the original polymer. It melted to a clear glass at 210-215° C. and did not discolor on standing or heating. Analysis indicated that it contained 22.2% sulphur and the molecular weight was found to be 5988. The calculated sulphur content and molecular weight for a product of the formula $$(C_6H_{10}SO_2)_{40}C_6H_{10}OCOCH_3$$

are 21.4% and 5981, respectively.

*Example V*

Ten (10) grams of cyclohexene-sulphur dioxide polymer prepared as in Example I was dissolved in 40 cc. of chloroacetyl chloride and the reaction mixture was subsequently treated as in Example IV. Nine and one half grams of precipitated polymer was obtained. It had a melting range of 215-220° C. and had the same solubility characteristics as the original polymer. Analysis indicated that the product contained 21.6% sulphur and 0.46% chlorine. The molecular weight was found to be 5430. The calculated sulphur content, chlorine content, and molecular weight are, respectively, 21.2%, 0.58%, and 6015, these figures being given for a product of the formula $(S_6H_{10}SO_2)_{40}C_6H_{10}OCOCH_2Cl$.

*Example VI*

A mixture of one gram of sulphur dioxide-pentene polymer and 3 cc. of trichloroacetyl chloride was allowed to stand at about 25° C. for 24 hours. The mixture was then poured into water and filtered. Most of the trichloroacetic acid was removed from the solid product by grinding with ethyl alcohol, filtering, and repeating the process using diethyl ether instead of alcohol. The trichloroacetyl derivative was then reprecipitated from its solution in acetone, filtered, ground with ethyl alcohol, and washed with diethyl ether.

In practicing the present invention, any olefine having the general formula given above may be used. Olefines which merit special mention are propene, pentene-2, 3-cyclohexylpropene-1, 2-methylpropene, pentene-1, nonene-1, cyclohexene, ethylene, 3-methylcyclohexene, octene-2, allyl alcohol, undecylenyl alcohol $$(CH_2=CH\cdot(CH_2)_7\cdot CH_2OH),$$

butene-1, and octene-1.

Commercial sulphur dioxide can be used satisfactorily in the present invention. If particular purification is desired, this can be accomplished by bubbling the gas through concentrated sulphuric acid.

The proportions of sulphur dioxide to olefine can be varied as desired since an excess of either reactant can be removed from the reaction products without undue difficulty. Since the olefine and sulphur dioxide react in equimolecular proportions, it is desirable (for the sake of economy) to use them in that ratio.

The particular catalytic composition utilized to most advantage in the preparation of the olefine-sulphur dioxide polymeric reaction products and the best manner of its application depend to a large extent upon the specific olefine being treated. The catalyst may consist of aqueous hydrogen peroxide or aqueous hydrogen peroxide in conjunction with an alcohol or a mixture of alcohols. When the catalyst is a composite one, the components thereof may be added to the materials to be condensed, jointly or severally in any desired order.

So far as is known, all alcohols act to at least some extent as adjuvants for aqueous hydrogen peroxide. The alcohol may be primary, secondary or tertiary and may belong to any one of the aliphatic, cycloaliphatic or aromatic series. The saturated aliphatic alcohols having up to five or six carbon atoms, such as ethanol, propanol, butanol, isopropanol, isobutanol, glycol and the like, have been found most effective. Alcohols may be used to advantage in practically any amounts, a convenient and effective range being about one to ten volumes for each volume of aqueous hydrogen peroxide. The alcohol may be anhydrous or hydrous.

It is convenient to use ordinary 3% commercial aqueous hydrogen peroxide not only because it is readily available, cheap and non-corrosive but also because it affords a convenient way of introducing water into the reaction mixture which, as indicated hereinafter, is conducive to the stability of the polymerization products. Lower or higher concentrations can be used without deleteriously affecting the condensation. Solutions of 30% concentrations are of value (when used in proper proportions) in effecting the addition of sulphur dioxide to olefines which react only sluggishly in the presence of more dilute aqueous hydrogen peroxide. Very desirable results are obtained when aqueous hydrogen peroxide is used in the ratio of 0.3 to 0.5 parts by weight of pure hydrogen peroxide for each 100 parts by weight of olefine. This amounts to roughly 10-15% by volume of 3% aqueous hydrogen peroxide. Corresponding proportions are preferred when solutions of other strengths are employed. This preferred range may, nevertheless, be varied depending upon the particular olefine being treated, the presence or absence of an alcohol and other features of the reaction. Empirical determinations which can be readily carried out will indicate the preferable procedure and catalyst with any given olefine.

The examples given herein show the formation of the sulphur dioxide-olefine polymers in a closed system which involves superatmospheric pressures. It is to be understood, however, that pressure is not critical and may be varied over wide limits. The reactions can be carried out at atmospheric pressures provided provision is made for minimizing loss of reactants by volatilization. By utilizing an apparatus provided with a reflux condenser for which the refrigerant is a material capable of maintaining a temperature of −50° C. or less (one such material being a mixture of acetone and solid carbon dioxide), the reactants can be mixed and allowed to reflux at room temperature and pressure. In large scale operations, pressures in the range of 5 to 500 atmospheres are preferably employed, but so far as is known the operable upper limit is determined only by the pressure capacity of the reaction vessel.

Although the temperature of the reaction mass does not generally exceed about 30° C., reaction temperatures are not critical. It is convenient to mix the reactants in liquid form at temperatures at which they ordinarily remain liquid and to allow the reaction mixture to slowly come back to room temperature in a sealed vessel capable of withstanding the pressures developed. The reaction temperatures are limited only by the stability of the unreacted olefine and the olefine-sulphur dioxide addition product, any temperatures not causing undesirable decomposition being satisfactory. The reaction is generally exothermic and this serves as a convenient source of heat. Extraneous heat may be utilized if desired.

The addition products obtained from olefines of the general formula set out above in which Z represents an alkyl group containing more than 5 carbon atoms, are softer and more plastic than those from olefines comprising fewer carbon atoms. The products prepared under completely anhydrous conditions seem to be less stable than those prepared in the presence of small amounts of water. Work carried out in an effort to determine the chemical structure of the polymeric reaction products of this invention is described in the Journal of the American Chemical Society, volume 56, pages 1815–19 and volume 57, pages 1691–96 and 2311–14.

The polymeric olefine-sulphur dioxide addition products, either alone or modified with natural resins, synthetic resins, cellulose derivatives, waxes, fillers, pigments, dyes, softeners and plasticizers, find use as molding compositions, particularly in the manufacture of low cost construction elements such as baseboards, window frames, and elements for cabinet work. The olefine-polysulphones prepared herein are also useful as coating compositions when dissolved in suitable solvents, either alone or in admixture with other materials of the types enumerated above. Such compositions are useful for coating all kinds of surfaces, such as wood, metals, glass, textile fabrics, paper, stone, concrete, brick, plaster board, etc. The olefine-polysulphones, particularly those which are very high-melting and insoluble in the usual paint, varnish and lacquer solvents, are also useful as pigments and fillers.

The process of this invention is a distinct advance in the art in that olefine-sulphur dioxide polymeric addition products are obtained in better yields, more cheaply, and more conveniently than has heretofore been possible. The process is vastly superior because of its extreme simplicity, the cheapness and availability of the catalysts, and the greater stability and reproducibility of the products. The carrying out of the reaction under self-generated pressure, which is a feature of the present invention, is more advantageous than the known processes which involve passing gaseous sulphur dioxide through the liquid olefine or in which sulphur dioxide and air are alternately bubbled through the olefine. The resins have the distinct advantage of being very cheap, principally because of the low price of the raw materials and the comparatively simple mechanical manipulations involved. As is well known, olefines of the character used herein may be obtained very cheaply from cracked petroleum hydrocarbons.

As many apparently widely different embodiments of this invention may be made without departing from the spirit and scope thereof, it is to be understood that we do not limit ourselves to the specific embodiments thereof except as defined by the appended claims.

We claim:
1. The process which comprises reacting sulphur dioxide, in the presence of aqueous hydrogen peroxide, with an olefinic compound having the formula:

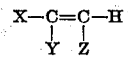

in which X and Y represent monovalent radicals from the group consisting of hydrogen, methyl and hydroxymethyl, Z represents a monovalent radical from the group consisting of hydrogen, simple alkyl groups, and alkyl groups having at least one hydrogen atom thereof replaced by a radical from the group consisting of hydroxyl and cycloaliphatic hydrocarbon radicals, and in which Y and Z together may represent a saturated divalent hydrocarbon radical containing less than seven carbon atoms provided, however, that X, Y, and Z are not all alkyl groups.

2. The process which comprises reacting sulphur dioxide, in the presence of aqueous hydrogen peroxide and an alcohol, with an olefinic compound having the formula:

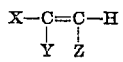

in which X and Y represent monovalent radicals from the group consisting of hydrogen, methyl and hydroxymethyl, Z represents a monovalent radical from the group consisting of hydrogen, simple alkyl groups, and alkyl groups having at least one hydrogen atom thereof replaced by a radical from the group consisting of hydroxyl and cycloaliphatic hydrocarbon radicals, and in which Y and Z together may represent a saturated divalent hydrocarbon radical containing less than seven carbon atoms provided, however, that X, Y, and Z are not all alkyl groups.

3. The process which comprises reacting sulphur dioxide, in the presence of about 3% aqueous hydrogen peroxide, with an olefinic compound having the formula:

in which X and Y represent monovalent radicals from the group consisting of hydrogen, methyl and hydroxymethyl, Z represents a monovalent radical from the group consisting of hydrogen, simple alkyl groups, and alkyl groups having at least one hydrogen atom thereof replaced by a radical from the group consisting of hydroxyl and cycloaliphatic hydrocarbon radicals, and in which Y and Z together may represent a saturated divalent hydrocarbon radical containing less than seven carbon atoms provided, however, that X, Y, and Z are not all alkyl groups, said aqueous hydrogen peroxide being present in an amount equal to about 5–10% by volume of the olefinic compound.

4. The process which comprises reacting sulphur dioxide, in the presence of aqueous hydrogen peroxide, with an olefinic compound having the formula:

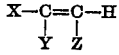

in which X and Y represent monovalent radicals from the group consisting of hydrogen, methyl and hydroxymethyl, Z represents a monovalent radical from the group consisting of hydrogen, simple alkyl groups, and alkyl groups having at least one hydrogen atom thereof replaced by a radical from the group consisting of hydroxyl and cycloaliphatic hydrocarbon radicals, and in which Y and Z together may represent a saturated divalent hydrocarbon radical containing less than seven carbon atoms provided, however, that X, Y, and Z are not all alkyl groups, said reaction being carried out at temperatures not exceeding about 30° C.

5. The process which comprises reacting sulphur dioxide, in the presence of aqueous hydrogen peroxide, with an olefinic compound having the formula:

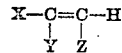

in which X and Y represent monovalent radicals from the group consisting of hydrogen, methyl and hydroxymethyl, Z represents a monovalent radical from the group consisting of hydrogen, simple alkyl groups, and alkyl groups having at least one hydrogen atom thereof replaced by a radical from the group consisting of hydroxyl and cycloaliphatic hydrocarbon radicals, and in which Y and Z together may represent a saturated divalent hydrocarbon radical containing less than seven carbon atoms provided, however, that X, Y, and Z are not all alkyl groups, said olefine and the sulphur dioxide being present in approximately equimolecular quantities.

6. The process which comprises reacting sulphur dioxide and an olefinic compound in the presence of aqueous hydrogen peroxide in a closed system at super-atmospheric pressure, said olefinic compound having the formula:

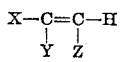

in which X and Y represent monovalent radicals from the group consisting of hydrogen, methyl and hydroxymethyl, Z represents a monovalent radical from the group consisting of hydrogen, simple alkyl groups, and alkyl groups having at least one hydrogen atom thereof replaced by a radical from the group consisting of hydroxyl and cycloaliphatic hydrocarbon radicals, and in which Y and Z together may represent a saturated divalent hydrocarbon radical containing less than seven carbon atoms provided, however, that X, Y, and Z are not all alkyl groups.

CARL SHIPP MARVEL.
DONALD SHERWOOD FREDERICK.